(12) United States Patent
Hwang et al.

(10) Patent No.: US 6,532,271 B1
(45) Date of Patent: Mar. 11, 2003

(54) CARRIER RECOVERY AND DOPPLER FREQUENCY ESTIMATION

(75) Inventors: Syang-Myau Hwang, Cupertino, CA (US); Lin Yang, Fremont, CA (US); Mao Yu, San Jose, CA (US); Gibong Jeong, San Diego, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 09/430,372

(22) Filed: Oct. 29, 1999

(51) Int. Cl.[7] .............................................. H04L 27/22
(52) U.S. Cl. ........................ 375/326; 375/345; 342/100; 342/199
(58) Field of Search ........................ 342/99, 100, 103, 342/199; 375/320, 345, 326

(56) References Cited

U.S. PATENT DOCUMENTS

| 4,527,278 A | | 7/1985 | Deconche et al. | |
|---|---|---|---|---|
| 5,909,148 A | * | 6/1999 | Tanaka | 329/306 |
| 6,044,105 A | * | 3/2000 | Gronemeyer | 375/152 |

FOREIGN PATENT DOCUMENTS

| GB | 2344493 A | 7/2000 |
|---|---|---|

OTHER PUBLICATIONS

Stevenage, Herts; "Doppler–shift correction via correlation for a received QPSK signal". 8049i IEE Proceedings–I; 137 (1990) Dec., No. 6, Part I, GB.

* cited by examiner

*Primary Examiner*—Amanda T. Le
(74) *Attorney, Agent, or Firm*—John F. Schipper

(57) ABSTRACT

Method and system for carrier recovery and estimation of Doppler shift from a signal source that is moving relative to a signal receiver. A pure carrier preamble for the received signal is processed through each of two stages of a linear predictor to obtain a successively more accurate estimation of a Doppler frequency offset for the carrier. The received signal is downconverted by each stage estimation of the Doppler frequency offset, and the downconverted signal is processed through a decision feedback phase locked loop to provide a signal in which substantially all of the Doppler offset and/or phase angle are identified and removed. The system has low complexity, is fast, and is accurate to within an estimated few tens of Hertz and will work with signals having relatively low signal-to-noise ratios. The invention is useful for receipt of signals from satellites in low earth orbits (LEOs) and other non-geosynchronous orbits, and wherever a transmitter and receiver are moving relative to each other.

25 Claims, 8 Drawing Sheets

CARRIER RECOVERY AND DOPPLER FREQUENCY ESTIMATION

FIELD OF THE INVENTION

This invention relates to estimation of Doppler shift for, and recovery of a carrier signal for, a received signal.

BACKGROUND OF THE INVENTION

In a traditional satellite communication system, the satellites are located in a geo-stationary orbit, approximately 35,784 km from the center of the Earth, and move at the same angular velocity as the Earth's surface, approximately $7.292 \times 10^{-5}$ radians per second. The Doppler frequency offset for a signal received from a transmitter located on such a satellite is small, usually much less than the symbol rate for the received signal. This small frequency offset reduces the requirements for carrier signal recovery at the receiver, assumed to be located on or near the Earth's surface. However, because of the great distance between a geo-stationary (GEO) satellite and a ground receiver, the signal round trip time propagation time is relatively long, at least about 0.1 sec, and such a transmission system offers a correspondingly reduced data transmission rate and requires relatively high transmitter power.

An alternative to the GEO system, referred to as a low Earth orbit or LEO system, locates one or more transmitting satellites closer to the Earth's surface, for example, at a distance of about 350 miles above the surface, and the satellites move with a greater angular velocity than does a GEO satellite, the corresponding Doppler frequency offset is higher, the round trip signal propagation time is reduced, the permitted data transmission rate is increased, and the required transmission power is reduced. A LEO satellite is moving faster than the in-view receiver, and the larger Doppler frequency offset is often larger than the symbol rate for the received signal. Estimation of the Doppler frequency offset and recovery of the carrier signal is a challenging task and usually requires a more complex receiver design.

Automatic frequency control (AFC), phase locked loop (PLL) processing, fast Fourier transform (FFT) processing and linear prediction (LP) are possible candidates for processing a Doppler-shifted received signal. AFC and/or PLL are presently used for cellular communications with GEO satellites, where the Doppler shift is at most a few hundred Hz. The maximum Doppler frequency offset that can be corrected using AFC or PLL is about 10 percent of the symbol rate, and the symbol rate is likely to be as low as 10–50 KHz. Further, the frequency acquisition time for AFC and/or PLL will depend strongly on the signal-to-noise ratio (SNR) or bit energy-to-noise ratio ($E_b/N_o$) and is generally much longer than the available time interval (e.g., a time slot length) when the Doppler frequency offset is large. Thus, use of AFC and/or PLL alone will not allow fast or reliable acquisition of a Doppler-shifted signal.

An FFT approach can be used to assist in carrier recovery by estimating a large frequency offset in a fixed time period. However, an FFT approach is complex, requires performance of a set of computations that is approximately proportional to $N \cdot \log(N)$, where N is the number of signal samples used for the estimates, and must operate in a block mode for computations so that all samples must be collected before computations begin. This will require complex processing and will not allow estimation of a Doppler frequency offset within a short time interval.

An LP approach can also be used to assist in carrier recovery by estimating a large frequency offset in a fixed time period. LP requires performance of a set of LP computations that is approximately proportional to N and operates in serial mode so that computations can begin before all signal samples are collected. However, the accuracy of an LP approach depends upon the frequency estimation range (larger ranges produce poorer accuracy) and upon the SNR. For medium to low SNR with a frequency estimation range larger than the symbol rate, an LP approach cannot estimate frequency offset to better than to within 5 percent of symbol rate with high probability.

What is needed is a system for Doppler frequency offset estimation and carrier signal recovery that has relatively low complexity and that provides an estimate within a time interval allotted to transmission of a few symbols in a time slot (a time interval enclosing one information unit, including a preamble, a unique word or other identifying indicium, and a payload). Preferably, the system should be able to estimate a Doppler frequency offset of any size, even one that is greater than the symbol transmission rate, should have a relatively short signal interrogation time for such estimation, should be accurate to within one percent for a received signal interrogated within an assigned time slot, should work quickly to provide a Doppler frequency offset estimate before the information unit has been completely received, should work with a bit energy ratio $E_b/N_o$ as low as 4.5 dB, and should have relatively low complexity.

SUMMARY OF THE INVENTION

These needs are met by the invention, which provides a simple, multi-stage Doppler frequency offset estimation system that (1) provides an estimate of Doppler frequency offset within one percent of the correct value, (2) provides this estimate within the present time slot and with relatively simple computations. The system uses first and second stage LP analysis with different parameter sets chosen for each of these stages, followed by a decision feedback PLL third stage that acquires and subsequently tracks the Doppler-shifted received signal. The first two stages provide down-conversion of the estimated Doppler frequency offset to a residual shift that can be captured and tracked by the PLL. The third stage uses decision feedback, second order PLL to acquire and track the residual frequency offset and phase angle. The final Doppler frequency offset is calculated from the results of all three stages, which operate serially and continuously. The system is especially useful for receipt of low orbit satellite signals with small to medium SNR.

DESCRIPTION OF BEST MODES OF THE INVENTION

Figure 1:
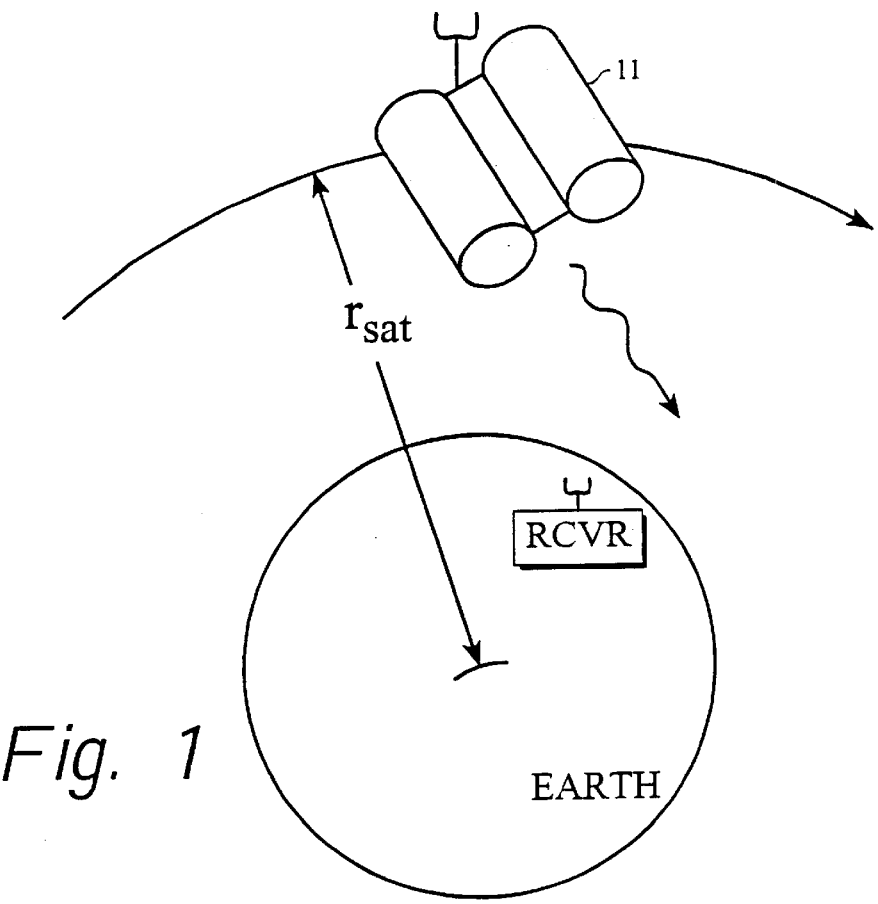
FIG. 1 illustrates the environment in which the invention is used.

FIG. 1 illustrates ah environment in which the invention can be used. A satellite 11, moving with an angular velocity of $\omega_{sat}$ and an orbit radius of $r = r_{sat} \approx \{M \cdot G / \omega_{sat}^2\}^{1/3}$, transmits a signal s(t) that is received, after a suitable signal propagation delay, by a receiver 13 moving approximately with the Earth's surface, at a radius $r_{rec}$ from the Earth's center C. Here, $M=6.099 \times 10^{12}$ Kgm is the Earth's mass and $G=6.66 \times 10^{-5}$ cm$^3$–sec$^{-2}$–Kgm$^{-1}$ is the Earth's gravitational constant.

A signal transmitted s(t) transmitted by the satellite 11 is assumed to include a preamble of a selected length $\Delta t(pre)$ that is pure carrier signal, with no message modulated thereon. This preamble, and the subsequent message modulated onto the carrier signal, is received by the receiver 13 and processed according to the invention to determine the present Doppler frequency offset $f_D$ at which the pure carrier signal is being received. The pure carrier signal may be represented as $$s(t;\text{carr})=s0(t)\exp(2\pi j \cdot f_D t)+n1(t) \quad (1)$$

at a particular time t, where n1(t) represents noise associated with the received signal at time t. Preferably, but not necessarily, the carrier signal frequency $f_{carr}$ is known at the receiver. In a first stage of an embodiment of the invention, the receiver 13 samples this received signal at a rate of $1/T_s$ per second, computes a correlation signal $s(kT_s;\text{carr}) \cdot s((k-K)T_s;\text{carr})^*$, and forms a sum S1 of a selected number N1 of these computed correlation signals:

$$S1(N1; K1; \text{carr}) = \sum_{k=1}^{N1} s(k \cdot T_s; \text{carr}) \cdot s((K1-k) \cdot T_s; \text{carr})^* \quad (2)$$
$$= N1 \cdot s_0 \cdot \exp(2\pi j \cdot K1 \cdot f_D \cdot T_s) + n2,$$

where K1 is a selected integer and n2 represents cumulative noise associated with the sum S1 in Eq. (2). The receiver now forms the function $$\tan^{-1}\{S1(N1;K1;\text{carr})/(2\pi \cdot K1 \cdot T_s)=f_{D1}+n3, \quad (3)$$

where n3 represents noise associated with the function computed in Eq. (3). This noise may be removed by appropriate low pass filtering, if the sampling rate $1/T_s$ is much lower than the rate of change associated with the noise n3, thus providing a first estimate, $f_{D1}$ of the Doppler frequency offset at which the carrier signal is received. This first stage will, in most circumstances, provide an estimation of the Doppler frequency offset $f_D$ that is within 10 percent of the symbol rate for the total signal s(t) (carrier plus message).

In a second stage, a first frequency-shifted carrier signal $$s2(t;\text{carr})=s(t;\text{carr})\exp(-2\pi j \cdot f_{D1} \cdot t)+n4(t) \quad (4)$$

is formed, where n4(t) represents noise. A second correlation S2 is computed, given by $$S2(N2; K2; \text{carr}) = \sum_{k=1}^{N2} s2(k \cdot T_s; \text{carr}) \cdot s2((K2-k) \cdot T_s; \text{carr})^* \quad (5)$$
$$= N2 \cdot s_0 \cdot \exp(2\pi j \cdot K1 \cdot f_{D2} \cdot T_s) + n5,$$

where N2 and K2 are selected integers and n5 represents cumulative noise. Optionally, the delay parameters N1 and N2 may be chosen to be equal but are preferably distinct. Optionally, the delay parameters K1 and K2 may be chosen to be equal but are preferably distinct. The receiver now forms the function $$\tan^{-1}\{S2(N2;K2;\text{carr})/(2\pi \cdot K2 \cdot T_s)=f_{D2}+n6, \quad (6)$$

where n6 represents noise associated with the function computed in Eq. (6) and is removable by appropriate low pass filtering. This second stage will, in most circumstances, provide an estimation of a residual $f_{D2}$ of the total Doppler frequency offset, $f_{D2}+f_{D1}$. This sum, $f_{D2}+f_{D1}$, is within 1 percent of the symbol rate for the Doppler-shifted preamble signal s(t;carr).

In a third stage, a second frequency-shifted total signal $$s3(t)=s(t)\exp(-2\pi j \cdot (f_{D2}+f_{D1}) \cdot t)+n7(t) \quad (7)$$

is formed, where n7(t) represents noise, and the signal s3(t) is processed by a decision feedback phase locked loop (DFPLL) to acquire and track the residual carrier frequency and phase offset. If the transmitted symbols are modulated using quadrant phase shift keying (QPSK), the receiver preferably uses nonlinear processing to remove the QPSK modulation and to retrieve the unmodulated residual carrier for subsequent tracking.

As an example, a LEO communication satellite may transmit at a symbol rate of 25 Hz, and a sampling rate of $f_s=1/T_s=150$ KHz (six times oversampling) may be used, with an associated maximum Doppler frequency offset $\Delta f_D = \pm 37.5$ KHz. Channel multiplexing occurs using a time division multiple access (TDMA) format, with each time slot having a time slot including 64 preamble symbols, followed by 12 symbols representing a unique word, followed by 384 symbols representing the payload. As indicated in the preceding, the preambles are assumed to be unmodulated to allow for carrier recovery. The unique word section may use binary phase shift keying (BPSK) for timing and time slot synchronization, and the payload section may use differential-encoded quadrant phase shift keying (DE-QPSK) signals. More generally, the sampling rate $f_s$ may be any suitable rate (e.g., up to 1 MHz, or even higher) that the receiver can process, consistent with the known or estimated carrier frequency.

In one approach, 60 samples (N1=60) are provided during a first 10-preamble-symbol-interval to compute a first estimate $f_{D1}$ of the Doppler frequency offset of the received signal, and a time delay corresponding to K1=1 is provided. A second group of 180 samples (N2=180) are provided during a second 30-preamble-symbol-interval, with a choice of time delay K2=20, to compute a second, more accurate estimate, $f_{D2}+f_{D1}$, of the Doppler frequency offset of the received signal. This approach uses 40 of the 64 preamble symbols in any time slot to provide an estimate of the Doppler frequency offset that is estimated to be within 1 percent of the true Doppler frequency offset, after the second stage. The over-sampling ratio (6:1), the time delay and the symbol length of the first and second intervals may be varied, consistent with the requirements for reliable statistics for the averaged signals and correlations. In the first stage, the magnitude of the Doppler offset estimation range is $\pm f_s/2$, or about $\pm 75$ KHz, with an estimation error of no more than 1 KHz for $E_b/N_o \geq 4.5$ dB. An estimated Doppler-shifted signal produced by the first stage is fed back to correct a first intermediate center frequency so that the magnitude of the offset frequency for the preamble signal s2(t) presented to the second stage is no more than about 100 Hz. The delay parameter K1 used for the first stage computations is preferably in the range K1=1–20 symbols so that, if desired, all computations can be completed using only the measurements taken from a single time slot.

The maximum frequency estimation range for the second stage is f2/2/20, or a maximum frequency range of $\pm 3.75$ KHz with $E_b/N_o \geq 4.5$ dB. An estimated Doppler-shifted signal for the second stage is fed back to correct a second intermediate center frequency so that the magnitude of the offset frequency for the preamble signal s3(t) presented to the third stage is no more than about 100 Hz. The signal s3(t) is acquired and subsequently tracked by a DFPLL or other suitable tracking system. After the third stage is completed, the estimated Doppler offset residual is less than 10 Hz, with $E_b/N_o \geq 4.5$ dB. This numerical example is illustrative and does not limit the ranges of the selected parameter values K1, K2, N1, N2, $f_{carr}$, symbol rate, $f_s$, oversampling rate, and other parameter values that may be selected for use with the invention.

Figure 2:
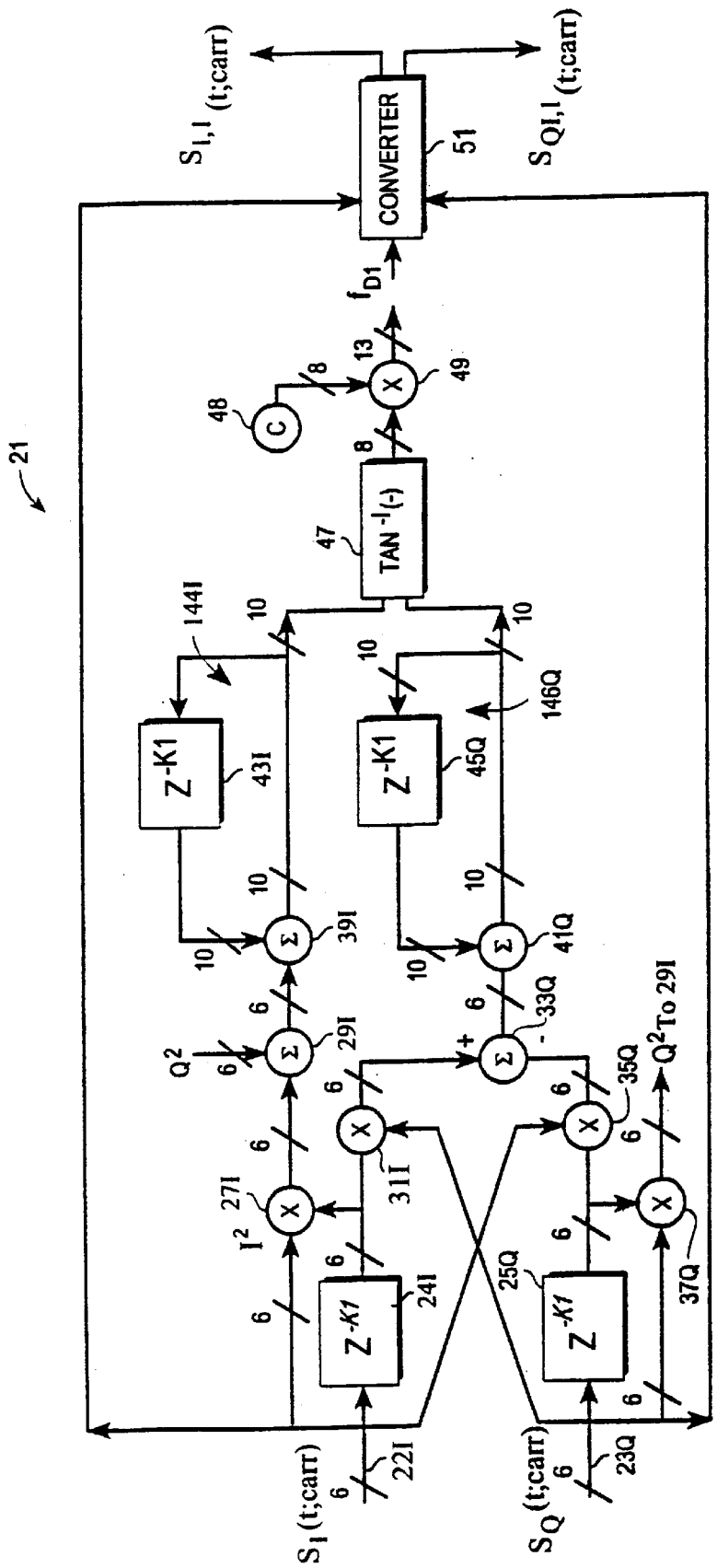
FIGS. 2, 3, 4, 5 and 6 illustrate apparatus suitable for practicing the invention.

FIG. 2 illustrates suitable first stage downconverter apparatus 21 associated with the receiver 13 for practicing one embodiment of the invention. A preamble of an incoming time slot information unit s(t) is provided as an in-phase signal $s_I(t;carr)$ and a quadrature signal $s_Q(t;carr)$ at input terminals, 22I and 23Q, respectively. The in-phase input signal $s_I(t;carr)$ provided at the input terminal 23I is sampled at a selected sampling time interval $1/T_s$ and is time delayed by a selected time interval $K1 \cdot T_s$ by a time delay module 24I. This time delayed version and the original version of the in-phase input signal $s_I(t;carr)$ are received at, and multiplied together by, a first multiplier module 27I; the issued product $s_I(t-K1 \cdot T_s;carr) s_I(t;carr)$ is received at a first input terminal of a first sum module 29I. The time delayed version of the signal provided at the input terminal 22I and a non-time delayed version of a quadrature input signal $s_Q(t;carr)$ provided at the input terminal 23Q are received at a second multiplier module 31I, which forms and issues a product signal $s_I(t-K1 \cdot T_s;carr) \cdot s_Q(t;carr)$. The product signal issued by the second multiplier module 31I is received at one input terminal of a second sum module 33Q.

The quadrature signal $s_Q(t;carr)$ provided at the input terminal 23Q is time delayed by the time interval $K1 \cdot T_s$ at a time delay module 25Q and is received by a first input terminal of a third multiplier module 35Q, which also receives the in-phase signal $s_I(t;carr)$ provided at tie input terminal 22I. The product of these signals, $s_Q(t-K1 \cdot T_s;carr) \cdot s_I(t;carr)$, is received by and summed at the second sum module 33Q. The time-delayed and non-time-delayed versions of the quadrature signal $s_Q(t;carr)$ received the input terminal 23Q are received and multiplied together by a fourth multiplier module 37Q, and the product issued by this multiplier module is received at a second input terminal of the first sum module 29I.

The sum produced by the first sum module 29I is received at a third sum module 39I, which forms one component of the first correlation signal S1(N1;K1;carr), using feedback with delay provided by a third time delay module 43I, which has an associated time delay of K1 units. The second sum module 39I and the third time delay module 43I serve as a first intermediate time delay loop 44I for the sum formed at the module 39I.

The sum produced by the second sum module 33Q is received at a fourth sum module 41Q, which forms another component of the first correlation signal S1(N1;K1;carr), using feedback with delay provided by a fourth time delay module 45Q, which has an associated time delay of K1 units. The fourth sum module 41Q and the fourth time delay module 45Q serve as a second intermediate time delay loop 46Q for the sum formed at the module 41Q.

The summed outputs of the third and fourth sum modules, 39I and 41Q, are received by an arctangent module 47 that forms and issues the function $\tan^{-1}\{S1(N1;K1;carr)\}$. The output of the arctangent module 47 is received multiplied by the quantity $\{2\pi \cdot K1 \cdot T_s\}^{-1}$ at a fifth multiplier module 49 to produce a first estimated Doppler frequency offset $f_{D1}$ for the carrier signal. The original carrier signals $s_I(t;carr)$ and $s_Q(t;carr)$ are also received at a first converter module 51, where the carrier signals are multiplied by a downconversion signal that uses the first estimated Doppler frequency offset. A first converted in-phase carrier signal, $$s_{I,1}(t;carr)=s_I(t;carr)\cdot\cos\{2\pi j \cdot f_{D1} \cdot t\}+s_Q(t;carr)\cdot\sin\{2\pi j \cdot f_{D1} \cdot t\} \quad (8)$$

and a first converted quadrature carrier signal, $$s_{Q,1}(t;carr)=-s_I(t;carr)\cdot\sin\{2j \cdot f_{D1} \cdot t\}+s_Q(t;carr)\cdot\cos\{2\pi j \cdot f_{D1} \cdot t\}, \quad (9)$$

defined as in Eq. (4), are issued by the converter module 51.

Figure 3:
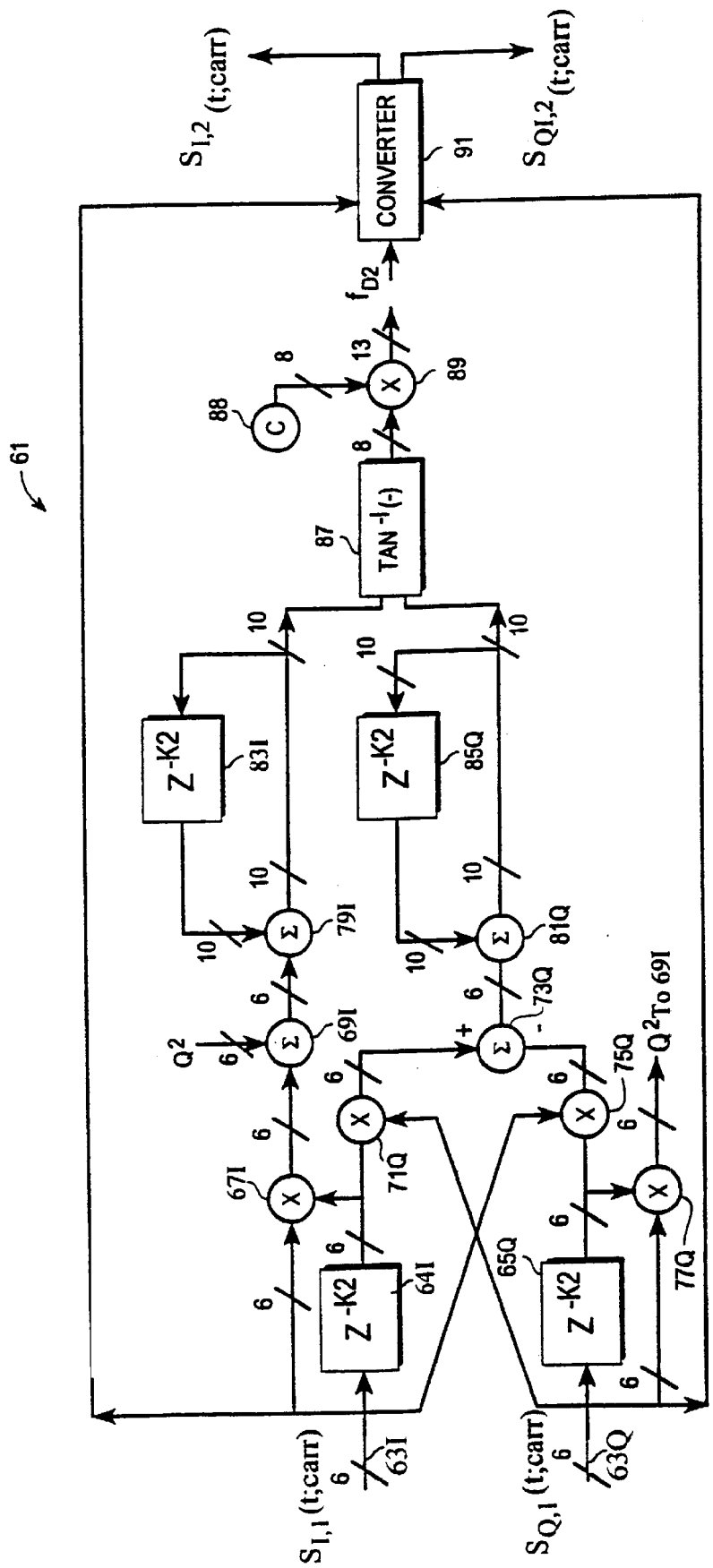

In FIG. 3, the first converted carrier signals, $s_{I,1}(t;carr)$ and $s_{Q,1}(t;carr)$, are received at in-phase and quadrature input terminals, 63I and 63Q, respectively, of a second stage downconverter apparatus 61 that processes the received signal exactly as did the first stage converter apparatus 21, but with possibly different parameters N2 and K2 replacing the corresponding parameters N1 and K1, respectively. The result is a second estimated Doppler frequency offset $f_{D2}$, determined as in Eqs. (5) and (6). A second converter module 91 receives the signals $f_{D2}$, $s_{I,1}(t;carr)$ and $s_{Q,1}(t;carr)$ and forms and issues a second converted in-phase carrier signal $$s_{I,2}(t;carr)=s_{I,1}(t;carr)\cdot\cos\{2\pi j \cdot f_{D2} \cdot t\}+s_{Q,1}(t;carr)\cdot\sin\{2\pi j \cdot f_{D2} \cdot t\} \quad (10)$$

and a second converted quadrature carrier signal $$s_{Q,1}(t;carr)=-s_{I,1}(t;carr)\cdot\sin\{2\pi j \cdot f_{D2} \cdot t\}+s_{Q,1}(t;carr)\cdot\cos\{2\pi j \cdot f_{D2} \cdot t\} \quad (11)$$

Figure 6:
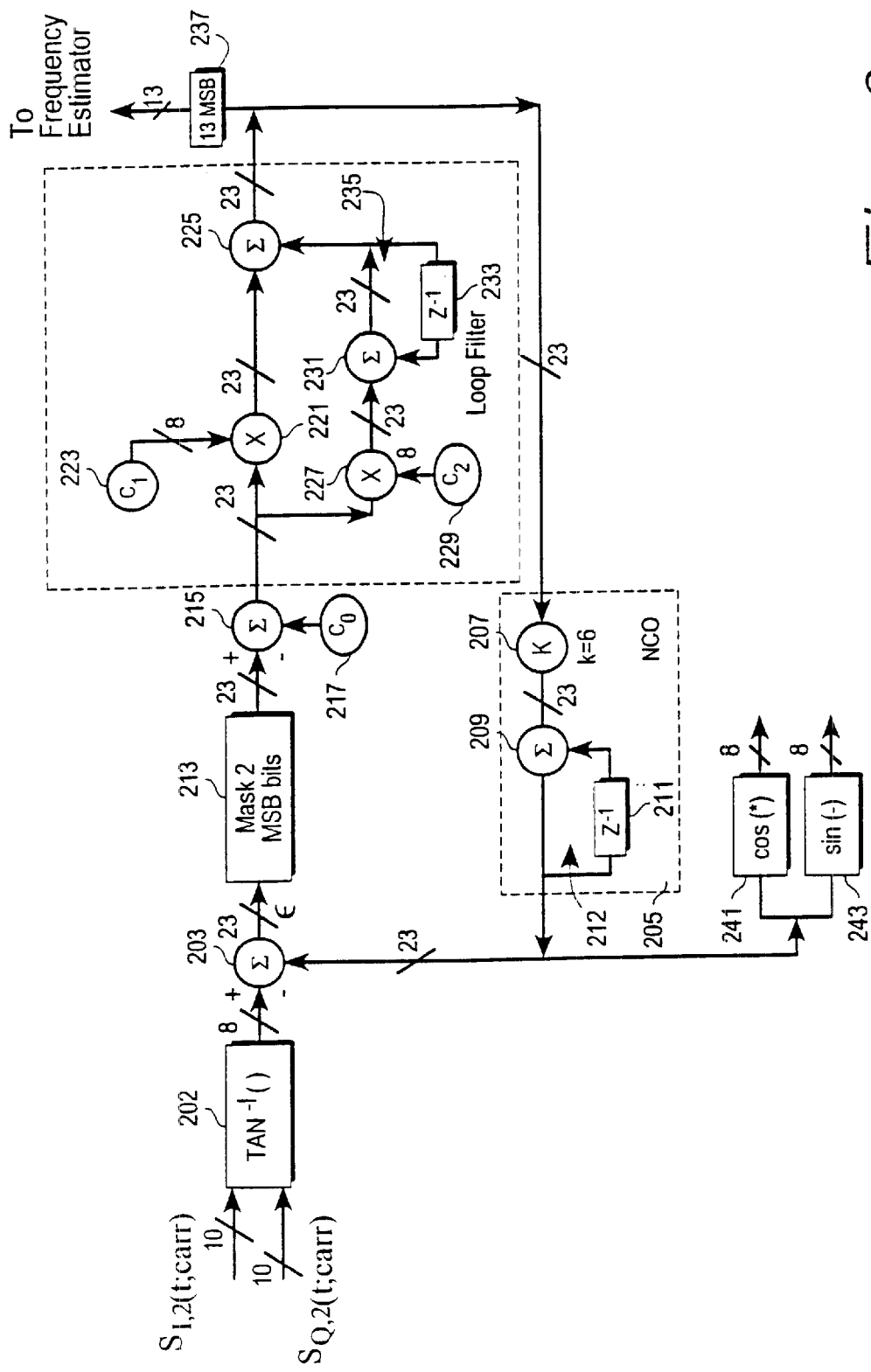

The second converted in-phase and quadrature signals are received at input terminals of a DFPLL system 101, shown in FIG. 6.

Figure 4:
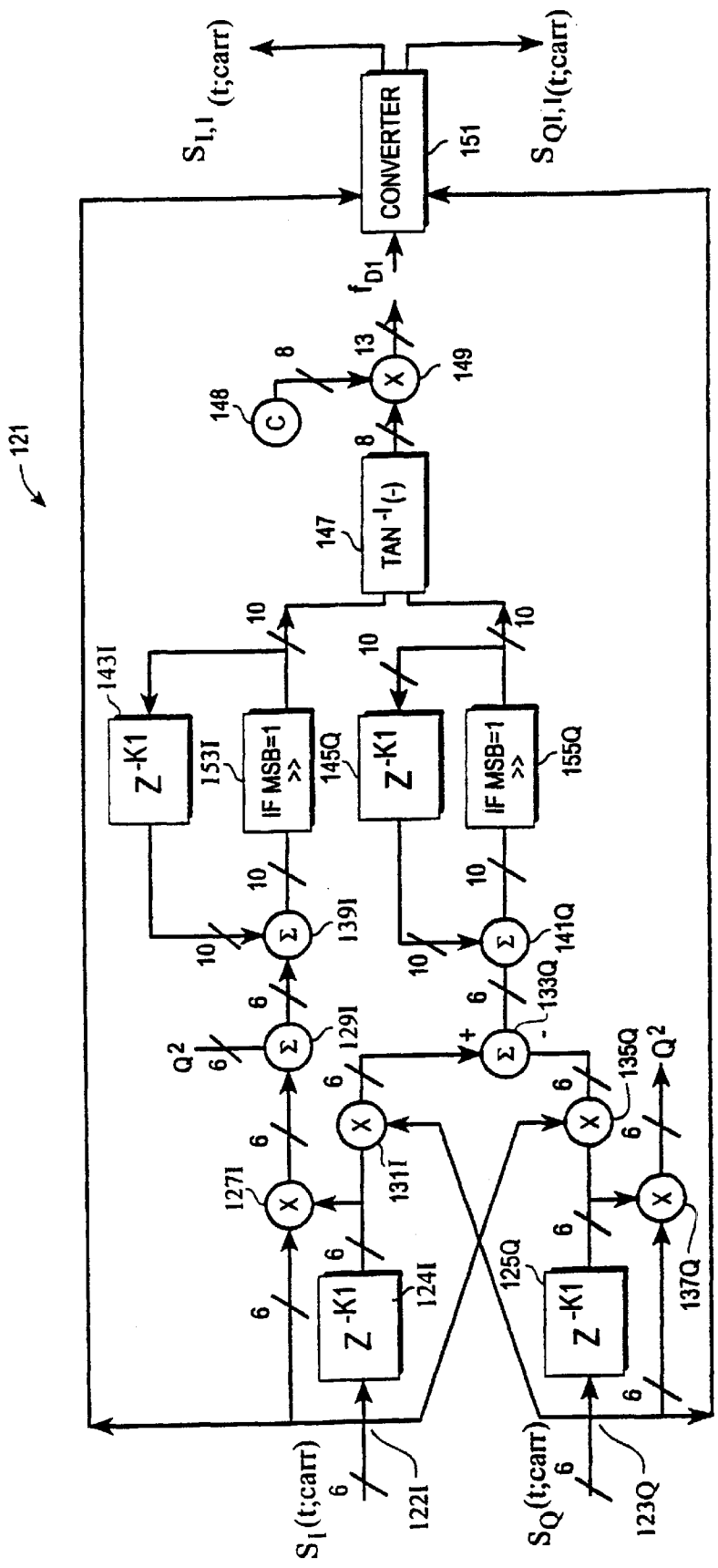

FIG. 4 illustrates suitable first stage downconverter apparatus 121 associated with the receiver 13 for practicing one embodiment of the invention. A preamble of an incoming time slot information unit s(t) is provided as an in-phase signal $s_I(t;carr)$ and a quadrature signal $s_Q(t;carr)$ at input terminals, 122I and 123Q, respectively. The in-phase input signal $s_I(t;carr)$ provided at the input terminal 122I is sampled at a selected sampling time interval $1/T_s$ and is time delayed by a selected time interval $K1 \cdot T_s$ by a time delay module 124I. This time delayed version and the original version of the in-phase input signal $s_I(t;carr)$ are received at, and multiplied together by, a first multiplier module 127I; the issued product $s_I(t-K1 \cdot T_s;carr) \cdot s_I(t;carr)$ is received at a first input terminal of a first sum module 129I. The time delayed version of the signal provided at the input terminal 122I and a non-time delayed version of a quadrature input signal $s_Q(t;carr)$ provided at the input terminal 123Q are received at a second multiplier module 131I, which forms and issues a product signal $s_I(t-K1 \cdot T_s;carr) \cdot s_Q(t;carr)$. The product signal issued by the second multiplier module 131I is received at one input terminal of a second sum module 133Q.

The quadrature signal $s_Q(t;carr)$ provided at the input terminal 123Q is time delayed by the time interval $K1 \cdot T_s$ at a time delay module 125Q and is received by a first input terminal of a third multiplier module 135Q, which also receives the in-phase signal $s_I(t;carr)$ provided at the input terminal 122I. The product of these signals, $s_Q(t-K1 \cdot T_s;carr) \cdot s_I(t;carr)$, is received by and summed at the second sum module 133Q. The time-delayed and non-time-delayed versions of the quadrature signal sQ(t;carr) received the input terminal 123Q are received and multiplied together by a fourth multiplier module 137Q, and the product issued by this multiplier module is received at a second input terminal of the first sum module 129I.

The sum produced by the first sum module 129I is received at a third sum module 139I, which forms one component of the first correlation signal S1(N1;K1;carr), using feedback with delay provided by a third time delay module 143I, which has an associated time delay of K1 units. The sum formed at the third sum module 139I is passed forward by a first interrogation module 153I if the most significant bit (MSB) of the sum is 0; if the MSB is 1, the sum is shifted right one unit and the resulting modified sum is passed forward. The second sum module 139I, the first interrogation module 153I and the third time delay module 143I serve as a first intermediate time delay loop for the sum formed at the sum module 139I.

The sum produced by the second sum module 133Q is received at a fourth sum module 141Q, which forms another component of the first correlation signal S1(N1;K1;carr), using feedback with delay provided by a fourth time delay module 145Q, which has an associated time delay of K1 units. The sum formed at the fourth sum module 141Q is passed forward by a second interrogation module 155Q if the MSB of the sum is 0; if the MSB is 1, the sum is shifted right one unit and the resulting modified sum is passed forward. The fourth sum module 141Q, the second interrogation module 155Q and the fourth time delay module 145Q serve as a second intermediate time delay loop for the sum formed at the sum module 141Q.

The sum produced by the first sum module 129I is received at a third sum module 139I, which forms one component of the first correlation signal S1(N1;K1;carr), using feedback with delay provided by a third time delay module 143I. The sum produced by the second sum module 133Q is received at a fourth sum module 141Q, which forms another component of the first correlation signal S1(N1;K1;carr), using feedback with delay provided by a third time delay module 145Q. The summed outputs of the third and fourth sum modules, 139I and 141Q, are received by an arctangent module 147 that forms and issues the function $\tan^{-1}\{S1(N1;K1;carr)\}$. The output of the arctangent module 147 is received multiplied by the quantity $\{2\pi \cdot K1 \cdot T_s\}^{-1}$ at a fifth multiplier module 149 to produce a first estimated Doppler frequency offset $f_{D1}$ for the carrier signal. The original carrier signals $s_I(t;carr)$ and $s_Q(t;carr)$ are also received at a first converter module 151, where the carrier signals are multiplied by a downconversion signal, $\exp\{-2\pi j \cdot f_{D1} \cdot t\}$. First converted in-phase and quadrature carrier signals, $s_{I,1}(t;carr)$ and $s_{Q,1}(t;carr)$, defined as in Eqs. (8) and (9), are issued by the converter module 151.

Figure 5:
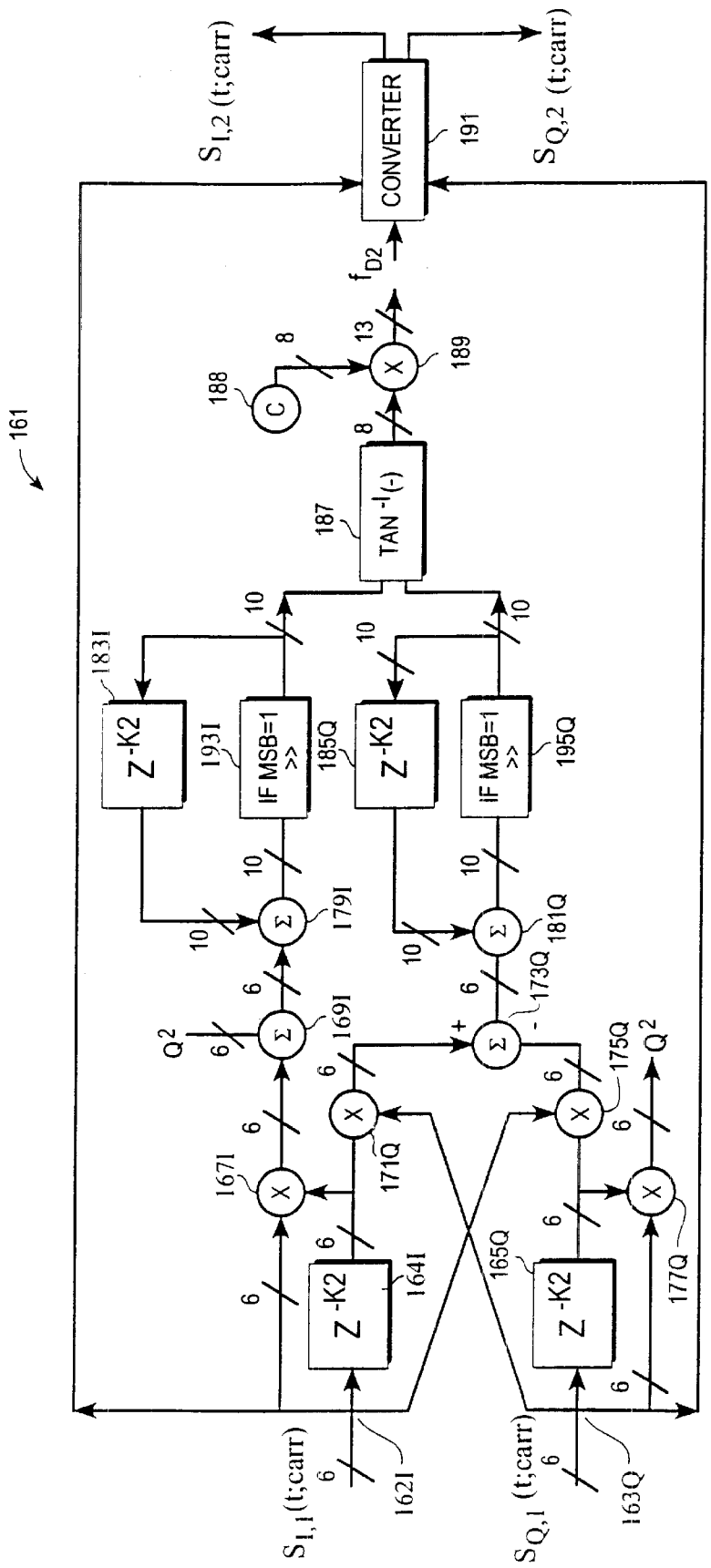

In FIG. 5, the first converted carrier signals, $s_{I,1}(t;carr)$ and $s_{Q,1}(t;carr)$, are received at in-phase and quadrature input terminals, 162I and 163Q, respectively, of a second stage downconverter apparatus 161 that processes the received signal exactly as did the first stage converter apparatus 121, but with possibly different parameters N2 and K2 replacing the corresponding parameters N1 and K1, respectively. The result is a second estimated Doppler frequency offset $f_{D2}$, determined as in Eqs. (5) and (6). A second converter module 191 receives the signals $f_{D2}$, $s_{I,1}(t;carr)$ and $s_{Q,1}(t;carr)$ and forms and issues second converted in-phase and quadrature carrier signals, $s_{I,2}(t;carr)$ and $s_{Q,2}(t;carr)$, defined as in Eqs. (10) and (11). The second converted in-phase and quadrature signals are received at input terminals of a DFPLL system 201, shown in FIG. 6.

Any of the following four combinations of first stage and second stage can be used with the invention: 21 and 61, 21 and 161, 121 and 61, 121 and 161.

FIG. 6 illustrates a DFPLL third stage 201 for the carrier recovery and Doppler offset estimation process. The signals $s_{I,2}(t;carr)$ and $s_{Q,2}(t;carr)$ are received at the I and Q input terminals of an arctangent module 202. The output phase angle $\phi(carr)$ is received at one input terminal of a phase comparator 203. A second input terminal of the phase comparator 203 is received from an NCO or VCO 205 in a feedback arrangement that forms a phase locked loop (PLL). An output of the phase comparator, representing a phase error signal, is received by a mask module 207 that masks the two most significant bits (MSBs) of the received signal and passes the masked signal to a first multiplier module 221 that has a parameter c0 that is selected by a first coefficient module 217. In one embodiment, the parameter c0 has one selected value, which is used to rotate the signal received from the mask module 113 by ±45°.

The output of the first sum module 215 is received by a loop filter 219 that is part of the feedback loop of the PLL. Within the loop filter 219, the output of the first sum module 215 is received by a first weighted multiplier module 221 that has a parameter c1 selected by a second coefficient module 223. In one embodiment, the parameter c1 has a first value, c1=750 Hz (binary value b00010101 or 00111100), when the PLL is in an acquisition mode and has a second value, c1=250 Hz (binary value b101101110), when the PLL operates in a tracking mode. The output of the first multiplier module 221 is received by a second sum module 225 that serves as an integrator.

The output of the first sum module 215 is also received by a second weighted multiplier module 227 that has a parameter c2 selected by a third coefficient module 229. In one embodiment, the parameter c2 has a first value, c2=750 Hz (binary value b00010101), when the PLL is in an acquisition mode and has a second value, c2=250 Hz (binary value b11000000), when the PLL operates in a tracking mode. The output of the second multiplier module 227 is received by a third sum module 231 that, together with a one-time-step delay module 233, forms a first intermediate delay-feedback loop 235 within the loop filter 219. The output of the intermediate loop 235 is received and processed by a mask module 237, which issues a signal including only the 13 MSBs, and is fed back to the NCO 205.

The output of the intermediate loop 235 is received by a sampling module 207 within the NCO 205. The output of the sampling module 207 is received by a third sum module 209. The sum module 209, together with a one-time-step delay module 211, forms a second intermediate delay-feedback loop 212 within the NCO 205. The output phase signal $\phi$(PLL) of the third sum module 209 is received at the second input terminal of the phase comparator 203 and is received at an input terminal of each of a cosine module 241 and a sine module 243 that form $\cos\phi$(PLL) and $\sin\phi$(PLL) for subsequent use.

In broad outline, the input signals $s_{I,1}(t;carr)$ and $s_{I,Q}(t;carr)$ for the DFPLL apparatus 201 are processed by the arctangent module 202 to determine the present carrier phase $\phi$(carr), which is implemented using a CORDIC algorithm. The resulting phase $\phi$(carr) is subtracted from the phase $\phi$(PLL) produced by the NCO 205 to provide an error signal $\epsilon$ that is processed by the PLL. The error signal can be directly fed into a slicer for symbol decision. To remove the accompanying QPSK modulation, the error signal $\epsilon$ is mapped to the first quadrant, then shifted by 45° clockwise so that $\epsilon$ is mapped to ±45°. The phase angles after processing by the arctangent module 202 (±180°) are normalized. By masking the two MSBs of the phase error signal $\epsilon$ in the mask module 113, the error signal is mapped into the first quadrant and the QPSK modulation is removed. The phase error signal $\epsilon$ is then rotated by 45° clockwise, and the phase error signal is now mapped to ±45°. The mapped error signal $\epsilon$ is then passed through an integrator-type loop filter (which serves as a low pass filter for the PLL), with adjustable bandwidth. The output of the loop filter 219 is fed to the NCO 205 for phase correction. The PLL is updated at a symbol rate of 25 KHz with loop filter bandwidth of 750 Hz for phase acquisition and 250 Hz for phase tracking.

Figure 7:
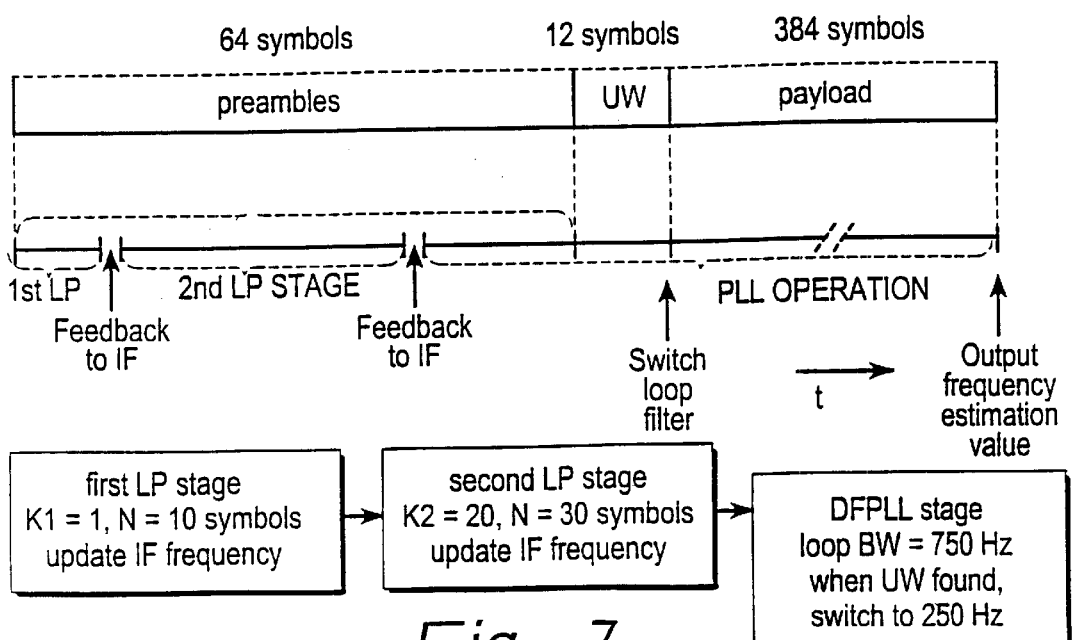
FIG. 7 illustrates application of the invention to a time slot.

The embodiment of the invention discussed in the preceding includes an LP first stage and an LP second stage, which correct the Doppler-shifted frequency, and a DFPLL third stage, which corrects one or both of Doppler-shifted frequency and phase for the received signal. FIG. 7 graphically illustrates some results of the numerical example discussed in the preceding. A signal preamble, which includes the carrier signal but not the message, includes 64 symbols and is followed by a unique word (UW) including another 12 symbols. A 384-symbol payload section follows the preamble and UW sections of the time slot, as shown. The first LP stage uses 10 preferably consecutive symbols and a delay time of K1·$T_s$=$T_s$ to form a correlation function, using these first 10 symbols and an oversampling rate of 6 to provide 60 values at a sampling rate of $f_s$=1/$T_s$, where $f_s$/6 is the symbol rate. The first estimation $f_{D1}$ for the Doppler frequency offset is computed using the relations (2) and (3).

The second LP stage, uses 30 preferably consecutive symbols from the preamble section, optionally beginning immediately following the last of the 10 symbols used for the first stage, with a delay time K2·$T_s$=20 $T_s$ and an oversampling rate of 6 to provide 180 values at a sampling rate of $f_s$. The second (residual) estimation $f_{D2}$ for the residual Doppler frequency offset is computed using the relations (5) and (6). The computations of $f_{D1}$ and $f_{D2}$ may be completed before the receiver 13 (FIG. 1) has received all 64 symbols from the presently received time slot.

The DFPLL third stage preferably uses a loop bandwidth (BW) of 750 Hz, which is switched to 250 Hz after capture and lock occurs, and part or all of the remainder of the preamble section (up to 24 symbols) and part or all of the UW symbols and payload symbols are used to determine the residual $f_{D3}$ of the total Doppler frequency offset, $$f_D(\text{est}) = f_{D1} + f_{D2} + f_{D3}, \quad (12)$$

$$f_{D3} = \sum_{n=1}^{N} f_{PLL}(n)/N, \quad (13)$$

where $f_{PLL}(n)$ is a frequency estimation value at the output of the DFPLL system at symbol number n and N is the number of symbols (preamble and/or UW and/or payload) used to estimate the residual Doppler frequency offset within the third stages. Preferably, the integer N is large, in a range of 100–400 in the preceding numerical example.

Figure 8:
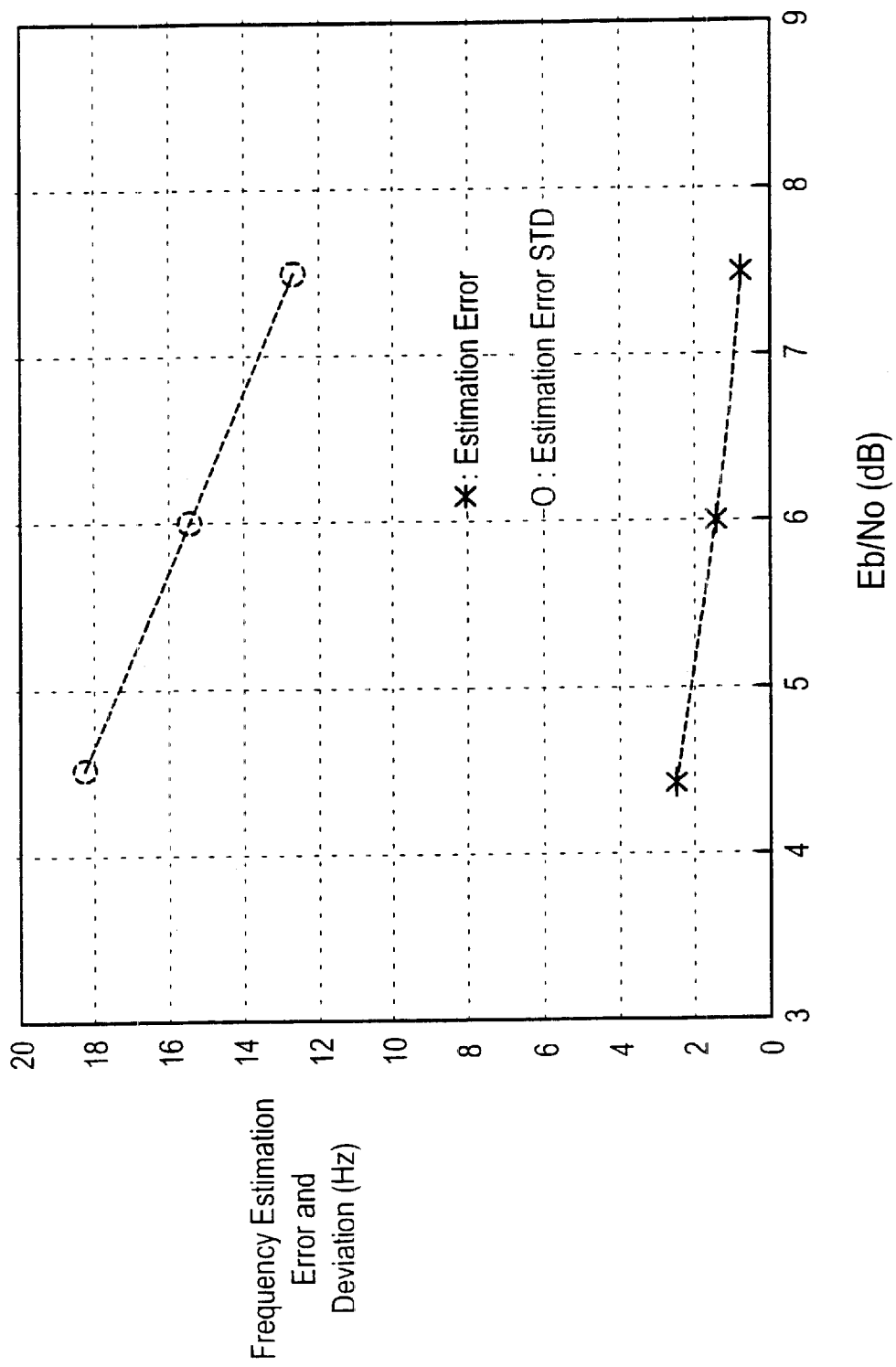
FIG. 8 graphically illustrates residual error using the invention.

This estimation of the total Doppler frequency offset is estimated to be accurate to within 10 Hz of the "true" Doppler frequency offset. FIG. 8 graphically illustrates the Doppler frequency offset estimation error (*) and associated standard deviation (o), obtained by simulation, versus the $E_b/N_o$ ratio for the received signal s(t). For $E_b/N_o$ greater than or equal to 4.5 dB, the estimation error decreases monotonically from about 2.5 Hz toward 0 and the associated standard deviation decreases monotonically from about 18 Hz toward 0, as the ratio $E_b/N_o$ increases. Where the statistics are further enhanced by averaging the values for 100 time slots, the estimation error and associated standard deviations are reduced to about 1 Hz and 3 Hz, respectively, for $E_b/N_o \geq 4.5$ dB, according to the simulation results.

The disclosed invention has relatively low complexity, allowing application of much less computing power than is required for a standard FFT approach. The invention is relatively fast and works with arbitrarily large Doppler offset, $f_D$, and each stage reduces the residual by one or more orders of magnitude. The invention provides an estimate of the total Doppler frequency offset $f_D$(est) that is within 10 Hz, often within 3 Hz, of the true Doppler frequency offset for the received signal, for $E_b/N_o \geq 4.5$ dB. Finally, the invention is robust and can estimate Doppler shift and allow recovery of carrier frequency and phase under low SNR conditions. The center frequency used for signal acquisition can be shifted by the Doppler frequency offset and the received signal can be subsequently tracked, even where the Doppler offset is changing rapidly.

Figure 9:
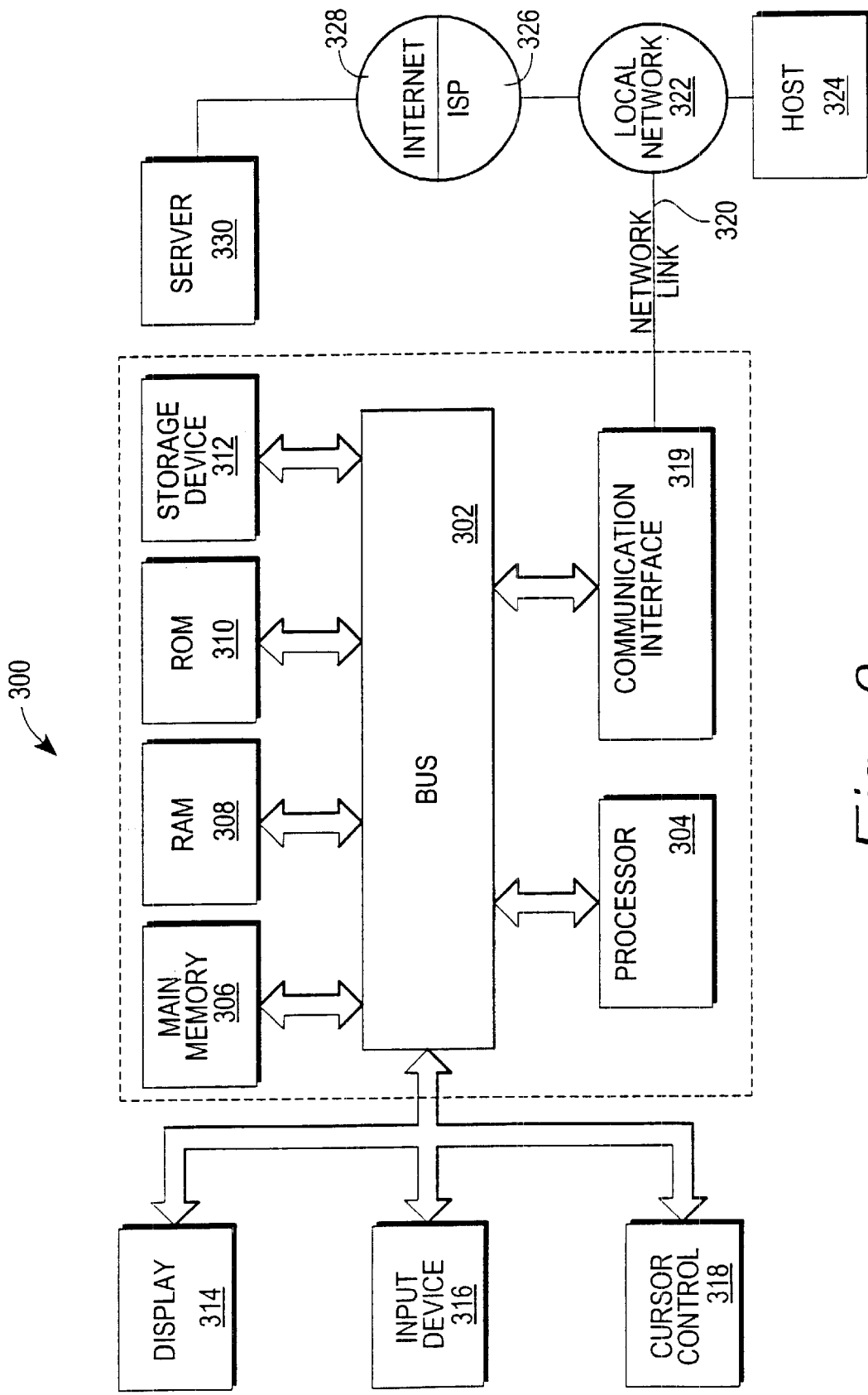
FIG. 9 is a schematic view of a computer system suitable for implementing the invention.

FIG. 9 shows a block diagram of a general computer system 300, which may be used to implement various hardware components of the invention, such as a client, an applications server and a database management system. The computer system 300 includes a bus 302 or other communication mechanism for communicating information and a processor 304, coupled with the bus 302, for processing information. The computer system 300 also includes a main memory 306, such as a random access memory (RAM) or other dynamic storage device 308, coupled to the bus 302, for storing information and instructions to be executed by the processor 304. The main memory 306 also may be used for storing temporary variables or other intermediate information during execution of instructions by the processor 304. The computer system 300 further optionally includes a read only memory (ROM) 310 or other static storage device, coupled to the bus 302, for storing static information and instructions for the processor 304. A storage device 312, such as a magnetic disk or optical disk, is provided and is coupled to the bus 302 for storing information and instructions.

The computer system 300 may also be coupled through the bus to a display 314, such as a cathode ray tube (CRT), for displaying information to a computer user. An input device 316, including alphanumeric and other keys, is coupled to the bus for communicating information and commands to the processor 304. Another type of user input device is a cursor control 318, such as a mouse, a trackball or cursor direction keys for communicating direction information and command selections to the processor 304 and for controlling cursor movement on the display 314. This input device typically has one degree of freedom in each of two axes, such as x- and y-axes, that allows the device to specify locations in a plane.

The functionality of the invention is provided by the computer system 300 in response to the processor 304 executing one or more sequences of instructions contained in main memory 306. These instructions may be read into main memory 306 from another computer-readable medium, such as a storage device 314. Execution of the sequences of instructions contained in the main memory 306 causes the processor 304 to perform the process steps described herein. In alternative embodiments, hard-wired circuitry may be used in place of, or in combination with, software instructions to implement the invention. Embodiments of the invention are not limited to any specific combination of hard-wired circuitry and software.

The term "computer-readable medium", as used herein, refers to any medium that participates in providing instructions to the processor 304 for execution. This medium may take many forms, including but not limited to non-volatile media, volatile media and transmission media. Non-volatile media includes, for example, optical and magnetic disks, such as the storage disks 312. Volatile media includes dynamic memory. Transmission media includes coaxial cables, copper wire and fiber optics and includes the wires that are part of the bus 302. Transmission media can also take the form of acoustic or electromagnetic waves, such as those generated during radiowave, infrared and optical data communications.

Common forms of computer-readable media include, for example, a floppy disk, a flexible disk, a hard disk, magnetic tape or any other magnetic medium, a CD-ROM, any other optical medium, punchcards, papertape, any other physical medium with patterns of holes or apertures, a RAM, a ROM, a PROM, an EPROM, a Flash-EPROM, any other memory chip or cartridge, a carrier wave as described hereinafter, or any other medium from which a computer can be read.

Various forms of computer-readable media may be involved in carrying out one or more sequences of one or more instructions to the processor 304 for execution. For example, the instructions may initially be carried on a magnetic disk of a remote computer. The remote computer can load the instructions into its dynamic memory and send the instructions over a telephone, using a modem. A modem local to the computer system 300 can receive data over a telephone line and use infrared transmitter to convert and transmit the data to the an infrared detector connected to the computer system bus. The bus will carry the data to the main memory 306, from which the processor receives and executes the instructions. Optionally, the instructions receive by the main memory 306 can be stored on the storage device 312, either before or after execution by the processor 304.

The computer system 300 also includes a communications interface 319, coupled to the bus 302, which provides two-way data communication coupling to a network link 320 that is connected to a local area network (LAN) or to a wide area network (WAN). For example, the communications interface 319 may be an integrated services digital network (ISDN) card or a modem to provide a data communication connection to a corresponding type of telephone line. As another example, the communications interface 319 may be a local area network card to provide a data communication connection to a compatible LAN. Wireless links may also be implemented. In any such implementation, the communications interface 319 sends and receives electrical, electromagnetic or optical signals that carry digital data streams representing various types of information.

The network link 320 typically provides data communication through one or more networks to other data devices. For example, the network link 320 may provide a connection through an LAN 322 to a host computer 324 or to data equipment operated by an Internet Service Provider (ISP) 326. The ISP, in turn, provides data communication services through the world wide packet data communication network, now commonly known as the "Internet" 328, served by one or more servers 330. The LAN 322 and the Internet 328 both use electrical, electromagnetic and/or optical signals to carry the digital data streams. The signals carried by these network, the signals carried on the network link 320 and the signals carried on the communications interface 319, are examples of carrier waves that transport the information.

What is claimed is:

1. A method for carrier signal recovery in the presence of a Doppler shift, the method comprising:

providing a carrier signal that may contain a Doppler-shifted replica of a desired signal;

processing a first portion of the carrier signal through a first linear predictor to obtain a first contribution to Doppler frequency offset for the received signal;

modifying a second portion of the carrier signal to obtain a first-modified signal from which the first offset contribution is removed;

processing the first-modified signal through a second linear predictor to obtain a second contribution to Doppler frequency offset for the received signal;

modifying the first-modified signal to obtain a second-modified signal from which the second offset contribution is removed; and processing the second-modified carrier signal through a phase locked loop circuit to estimate at least one of a phase angle and a third contribution to Doppler-frequency offset for the provided signal.

2. The method of claim 1, further comprising estimating said Doppler frequency offset for said carrier signal as a sum of said first, second and third Doppler frequency offset contributions.

3. The method of claim 1, further comprising providing as said first portion of said carrier signal a carrier signal segment including at least 10 symbols.

4. The method of claim 1, further comprising providing as said second portion of said carrier signal a carrier signal segment including at least 30 symbols.

5. The method of claim 1, wherein said process of modifying said second portion of said carrier signal to obtain said first-modified signal comprises multiplying said second portion of said carrier signal by a sinusoidal signal having a frequency equal to said first contribution to said Doppler frequency offset.

6. The method of claim 5, wherein said process of modifying said first-modified signal to obtain said second-modified signal comprises multiplying said first-modified signal by a sinusoidal signal having a frequency equal to said second contribution to said Doppler frequency offset.

7. The method of claim 1, wherein said process of processing said second-modified signal through said phase locked loop comprises processing said second-modified signal through a decision feedback phase locked loop to estimate at least one of said phase angle and said third contribution to said Doppler frequency offset for said provided signal.

8. A method for carrier signal recovery in the presence of a Doppler shift, the method comprising:

providing a first carrier signal s1(t) that may contain a Doppler-shifted replica of a desired signal;

computing a first correlation function $$S1(N1; K1; carr) = \sum_{k=1}^{N1} s1(k \cdot T_s; carr) \cdot s1((K1-k) \cdot T_s; carr)^*$$

of the carrier signal with itself, where N1 ($\geq 1$) is a first selected sample size, $K1 \cdot T_s$ is a first selected time delay and $1/T_s$ is a selected signal sampling rate;

computing a first Doppler offset component $$f_{D1} = \tan^{-1}\{S1(N1;K1;carr)\}/(2\pi \cdot K1 \cdot T_s);$$

forming a first-modified signal $$s2(t;carr) = s1(t;carr)\exp(-j2\pi f_{D1} \cdot t);$$

computing a second correlation function $$S2(N2; K2; carr) = \sum_{k=1}^{N2} s2(k \cdot T_s; carr) \cdot s2((K2-k) \cdot T_s; carr)^*$$

of the first-modified signal with itself, where N2 ($\geq 1$) is a second selected sample size and K2·$T_s$ is a second selected time delay;

computing a second Doppler frequency offset component $f_{D2}=\tan^{-1}\{S2(N2;K2;carr)\}/(2\pi \cdot K2 \cdot T_s)$;

forming a second-modified signal $s3(t;carr)=s2(t;carr)\exp(-j2\pi \cdot f_{D2} \cdot t)$;

and processing the second-modified signal through a phase locked loop circuit to estimate at least one of a phase angle and a third contribution to Doppler frequency offset for the provided signal.

9. The method of claim 8, further comprising estimating said Doppler frequency offset for said received carrier signal as a sum of said first, second and third Doppler frequency offsets.

10. The method of claim 8, further comprising:

forming said second modified carrier signal as $s3(t;carr)=s2(t;carr)\exp(-j2\pi \cdot f_{D2} \cdot t)$;

and processing said second modified signal by feedback decision phase locked loop analysis to obtain an estimate of at least one of a third Doppler frequency shift and a phase associated with said second modified carrier signal.

11. The method of claim 8, further comprising choosing said integers N1 and N2 to satisfy a relation N1≦N2.

12. The method of claim 11, further comprising choosing said integers N1 and N2 to be N1=60 and N2=180.

13. The method of claim 8, further comprising choosing said numbers K1 and K2 to satisfy a relation K1≦K2.

14. The method of claim 8, further comprising choosing said numbers K1 and K2 to be K1=1 and K2=20.

15. The method of claim 8, wherein said step of processing said second-modified signal through said phase locked loop circuit further comprises processing said second-modified signal through a decision feedback phase locked loop circuit to estimate at least one of said phase angle and said third contribution to Doppler frequency offset for said provided signal.

16. A system for carrier signal recovery in the presence of a Doppler shift, the system comprising:

a computer that is programmed:

to provide a carrier signal that may contain a Doppler-shifted replica of a desired signal;

to process a first portion of the carrier signal through a first linear predictor to obtain a first contribution to Doppler frequency offset for the provided signal;

to modify a second portion of the carrier signal to obtain a first-modified signal from which the first offset contribution is removed;

to process the first-modified signal through a second linear predictor to obtain a second contribution to Doppler frequency offset for the provided signal;

to modify the first-modified signal to obtain a second-modified signal from which the second offset contribution is removed; and to process the second-modified signal through a phase locked loop circuit to estimate at least one of a phase angle and third contribution to Doppler-frequency offset for the provided signal.

17. The system of claim 16, wherein said computer is further programmed to estimate said Doppler frequency offset for said carrier signal as a sum of said first, second and third Doppler frequency offset contributions.

18. The system of claim 16, wherein said computer is further programmed to provide as said first portion of said carrier signal a carrier signal segment including most 10 symbols.

19. The system of claim 16, wherein said computer is further programmed to provide as said second portion of said carrier signal a second carrier signal segment including at most 30 symbols.

20. The system of claim 16, wherein said computer is further programmed to modify said second portion of said carrier signal to obtain said first-modified signal by multiplying said second portion of said carrier signal by a sinusoidal signal having a frequency equal to said first contribution to said Doppler frequency offset.

21. The method of claim 20, wherein said computer is further programmed to modify said first-modified signal to obtain said second-modified signal by multiplying said first-modified signal by a sinusoidal signal having a frequency equal to said second contribution to said Doppler frequency offset.

22. The system of claim 16, wherein said computer is further programmed to process said second modified signal through said phase locked loop by processing said second modified signal through a decision feedback phase locked loop to estimate at least one of said phase angle and said third contribution to said Doppler-frequency offset for said provided signal.

23. The system of claim 16, wherein said computer is further programmed to process said first portion of said carrier signal through a first linear predictor to obtain first contribution to Doppler frequency offset for said provided signal by:

computing a first correlation function $$S1(N1; K1; carr) = \sum_{k=1}^{N1} s1(k \cdot T_s; carr) \cdot s1((K1-k) \cdot T_s; carr)^*$$

of said provided signal with itself, where N1 ($\geq 1$) is a first selected sample size, K1·$T_s$ is a first selected time delay and 1/$T_s$ is a selected signal sampling rate; and computing said first Doppler frequency offset component as $f_{D1}=\tan^{-1}\{S1(N1;K1;carr)\}/(2\pi \cdot K1 \cdot T_s)$.

24. The system of claim 23, wherein said computer is further programmed to process said second portion of said provided signal through a second linear predictor to obtain a second contribution to Doppler frequency offset for said provided signal by:

forming said first-modified signal as $s2(t;carr)=s1(t;carr)\exp(-j2\pi \cdot f_{D1} \cdot t)$;

computing a second correlation function $$S2(N2; K2; carr) = \sum_{k=1}^{N2} s2(k \cdot T_s; carr) \cdot s2((k-K2) \cdot T_s; carr)^*$$

of said first-modified signal with itself, where $N2$ ($\geq 1$) is a second selected sample size and $K2 \cdot T_s$ is a second selected time delay; and computing said second Doppler frequency offset component as $$f_{D2} = \tan^{-1}\{S2(N2;K2;carr)\}/(2\pi \cdot K2 \cdot T_s).$$

25. The system of claim 24, further comprising forming said second-modified carrier signal $s3(t;carr)$ according to $$s3(t;carr) = s2(t;carr)\exp(-j2\pi \cdot f_{D2} \cdot t).$$

* * * * *